(12) United States Patent
Malacsina

(10) Patent No.: US 6,746,305 B2
(45) Date of Patent: Jun. 8, 2004

(54) HONEY PACKAGING AND METHOD

(76) Inventor: Bela Malacsina, 8574 Seminole Pratt Whitney Rd., Loxahatchee, FL (US) 33470

( * ) Notice: Subject to any disclaimer, the term of this patent is extended or adjusted under 35 U.S.C. 154(b) by 32 days.

(21) Appl. No.: 10/082,832

(22) Filed: Feb. 25, 2002

(65) Prior Publication Data

US 2003/0162478 A1 Aug. 28, 2003

(51) Int. Cl.⁷ .......................... A01K 47/04; A01K 59/00
(52) U.S. Cl. ................. 449/5; 449/42; 449/44
(58) Field of Search ................. 449/5, 35, 37, 449/42, 43, 44, 60, 29; 206/459.5, 459.1

(56) References Cited

U.S. PATENT DOCUMENTS 1,797,021 A * 3/1931 Reif ..................... 426/413
1,882,938 A * 10/1932 Root ..................... 449/44
1,973,208 A * 9/1934 Hilbert ..................... 449/2
2,591,328 A * 4/1952 Yanik ..................... 449/17
4,195,379 A * 4/1980 Krasnik ..................... 449/17
4,639,962 A * 2/1987 Hogg ..................... 449/17
5,291,990 A * 3/1994 Sejzer ..................... 206/748

* cited by examiner

Primary Examiner—Son T Nguyen
(74) Attorney, Agent, or Firm—Norman Friedland

(57) ABSTRACT

Unadulterated and natural honey is packaged in a template by providing a plurality of templates formed from planar wood members that are vertically installed in a box-like container mounted above a beehive and providing a recess in the planar wood member that is closed on the bottom face by a wax foundation sheet where passageways lead the worker bees and excludes the queen bee to the recess for depositing the honey. The template is removed from the box-like container and installed in a box or package for retail sales and obviating the necessity of transporting the honey from the beehive to the processing plant and avoiding the steps of centrifuging and heating.

5 Claims, 4 Drawing Sheets

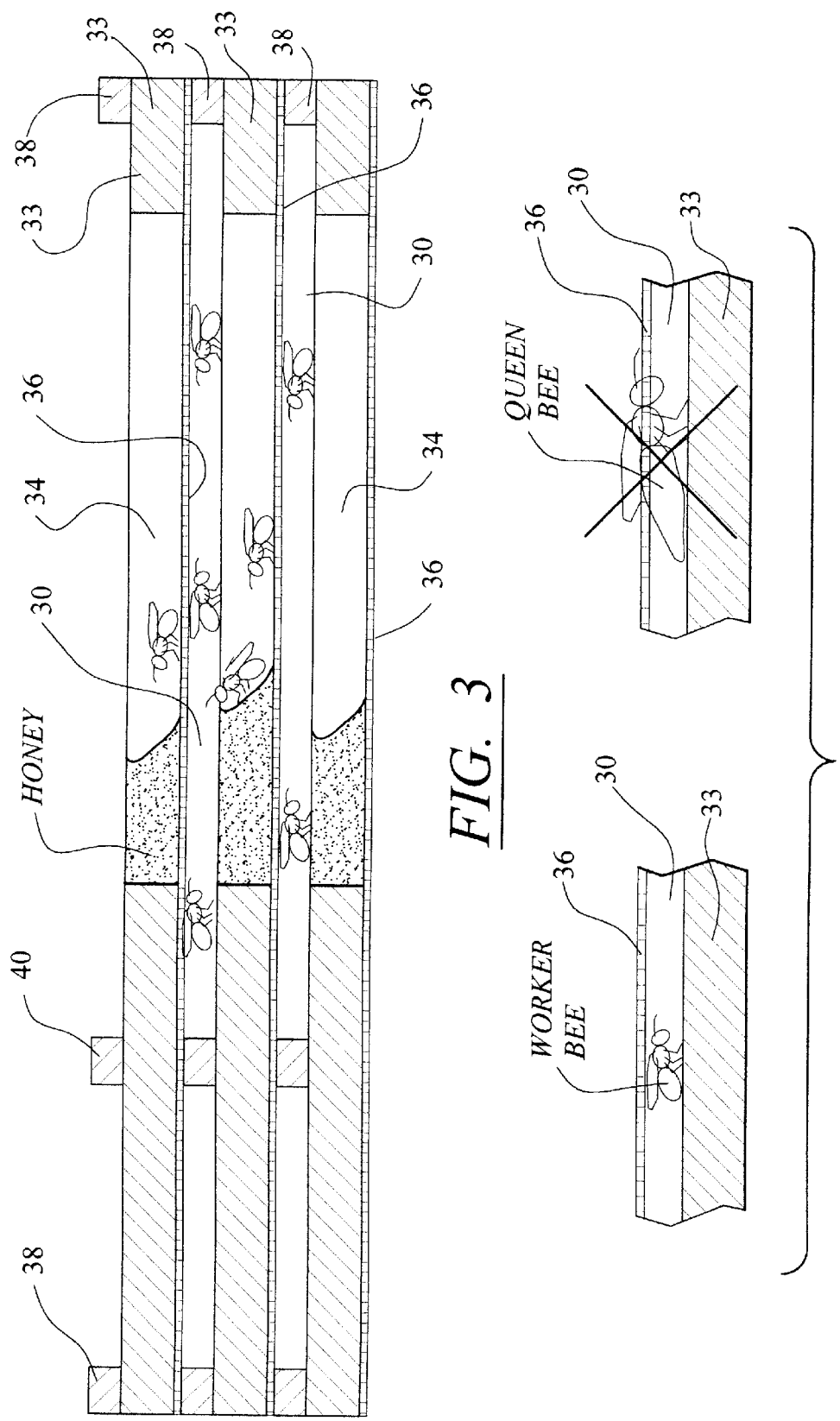

HONEY PACKAGING AND METHOD

TECHNICAL FIELD

This invention relates to packaging of honey produced by honey bees and particularly to a package for honey and the method of preparing the package without the use of human intervention and handling.

BACKGROUND OF THE INVENTION

As is well known to those skilled in this technology, honey is a product produced by honey bees that are members of the family Apidea and the honey product is typically collected from bee hives after the bees have produced the honey. The bees reside as a family in a bee hive. The bee family consists of a queen bee whose sole purpose is to lay eggs for producing worker and drone bees. The sole purpose of the worker bee is to continuously produce honey which is an excretion that occurs after the bees have collected nectar from foliage. For the purpose of this invention, it is only the worker bee is the subject matter of this disclosure. Worker bees, as stated above, do little else but produce honey which is a natural phenomenon that occurs through inversion from the nectar obtained from flowers. In commercial operations the beekeeper provides hives which are formed with supers which are mounted on movable frames. The bees excrete the honey and beeswax in the supers and ultimately, the frames are removed from the hives and then inserted into an extractor where they are centrifuged so as to separate the honey from the beeswax. Through discharge outlets on the extractor the honey is collected in drums or the like. The honey collected in the drums is then processed and this is typically done by a processing company whose function is to insert the honey into containers, such as bottles, jars and the like, for distribution and consumer retail sales. In this process the drums or the like are heated so as to change the viscosity of the honey to allow it to freely flow into the bottles or jars.

Obviously, in going from the bee hive to the ultimate container used for distribution and sales, this process or procedure requires the use of human hands or human intervention. Or, in other words, the honey is not unadulterated. In each step, from the bee hive to the extractor, to the drums and to the containers for distribution and sale, the honey has the propensity of being contaminated. Whenever a container, drum, extractor or other equipment is used, it becomes quite possible that foreign matter can get into the honey or to some extent contamination can occur. Moreover, the heating of the honey breaks down the chemical composition of the constituents in the honey which affects its taste and odor.

I have found that there is a demand for the honey product that has not been touched or processed by the human hands or human intervention; that is to say, unadulterated. To this end, I provide a template consisting of a planar wood member with a cut-out located intermediate the top, bottom and opposite sides of the wood member with the cut-out extending clear through from the front face to the back face, and a wax foundation mounted on the back face of the wood member overlies the cut-out portion to define a pocket. A plurality of these wood members are vertically and parallely stacked in a box-like container and removably mounted above a bee hive. It is important that the dimension of the space between adjacent wood members provide passageways for the bees to access the cut-out portion. This space is sufficient to allow the worker bee to traverse the template to reach the cut-out portion but yet not wide enough to allow the queen bee to enter. Also, the space is not sufficiently wide to allow the bee to excrete the honey thereon so that the excretion process only occurs in the cut-out portion. When the cutout portion is completely filled, the template becomes the holder of the honey which is then inserted into a suitable package for distribution and sale. Obviously, unlike the heretoforeknown commercial processes, the honey processed in accordance with this invention requires no additional processing and alleviates the necessity of being handled by human beings, other than removing the template from the box-like container without touching the honey and inserting it into a package or box for commercial sales.

SUMMARY OF THE INVENTION

An object of this invention is to provide an improved honey for retail sales.

A feature of this invention is to package honey into a template formed from a planar wood having a cut-out portion for receiving the honey.

Another object of this invention is to provide a method for packaging unadulterated honey for commercial retail sales. The method consists of vertically stacking a plurality of planar wood templates with a recess, sealed at one end to define a pocket, providing space between templates sufficiently wide to allow the passage of only worker bees and sufficiently narrow to prevent worker bees from excreting honey thereon where the passages allow egress into the recess portion where the honey is excreted and then, packaging the template in a box for commercial retail distribution and sales.

The foregoing and other features of the present invention will become more apparent from the following description and accompanying drawings.

BRIEF DESCRIPTION OF THE DRAWINGS

FIG. 3 is a view in section taken along lines 3—3 of FIG. 2;

FIG. 4 is a partial view in section and schematic illustrating the space for the passageway leading from the beehive to the cut-out portion of the template of this invention.

These figures merely serve to further clarify and illustrate the present invention and are not intended to limit the scope thereof.

DETAILED DESCRIPTION OF THE INVENTION

The template of this invention is designed with the configuration of the State of Florida being the cut-out portion for holding the honey and as one skilled in this art will appreciate the cut-out portion can take any configuration, whether it be a standard square, rectangular, circular shape or other fancy configuration. It will be noted that the cut-out portion is always intermediate the top, bottom and opposite side walls of the template. While in the preferred embodiment the template is made of wood, as one skilled in the art will appreciate any other material can be used for the template so long as the honeybees will excrete honey in the cut-out portion.

Figure 1:
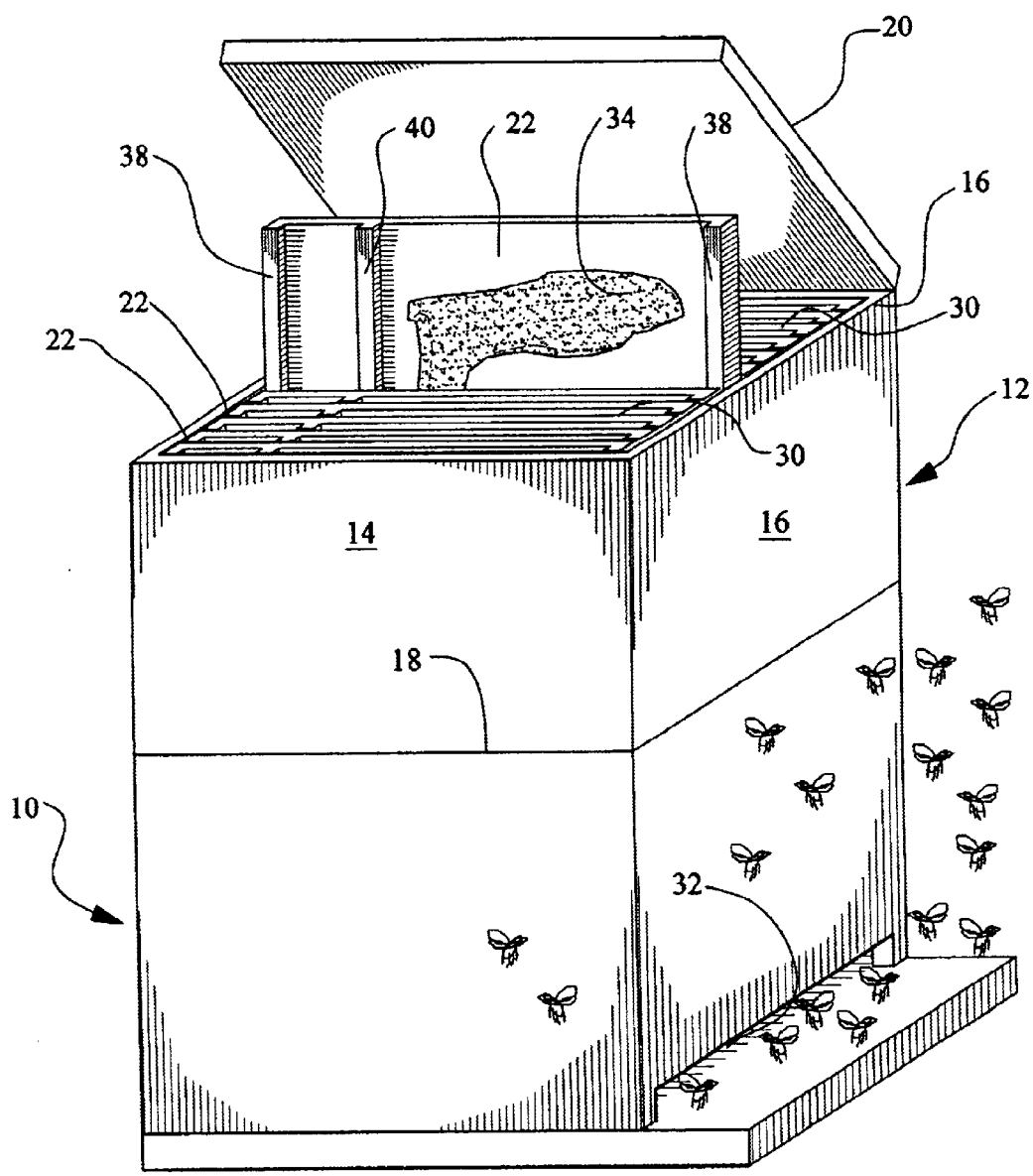
FIG. 1 is a perspective view of the beehive and the bee collection box and template of this invention.
Figure 2:
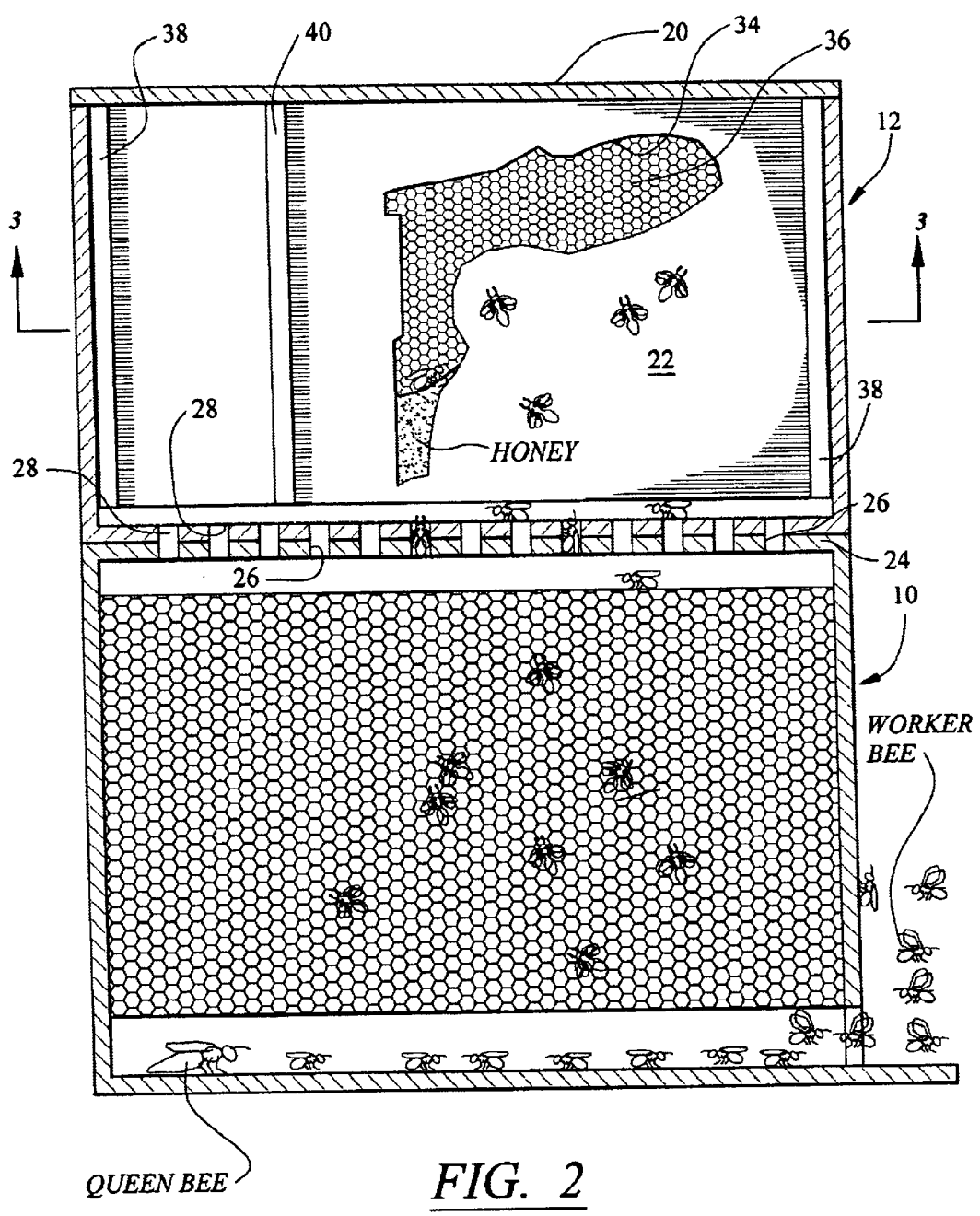
FIG. 2 is a view in elevation and section of the apparatus depicted in FIG. 1 illustrating the details of the beehive and the template of this invention.
Figure 5:
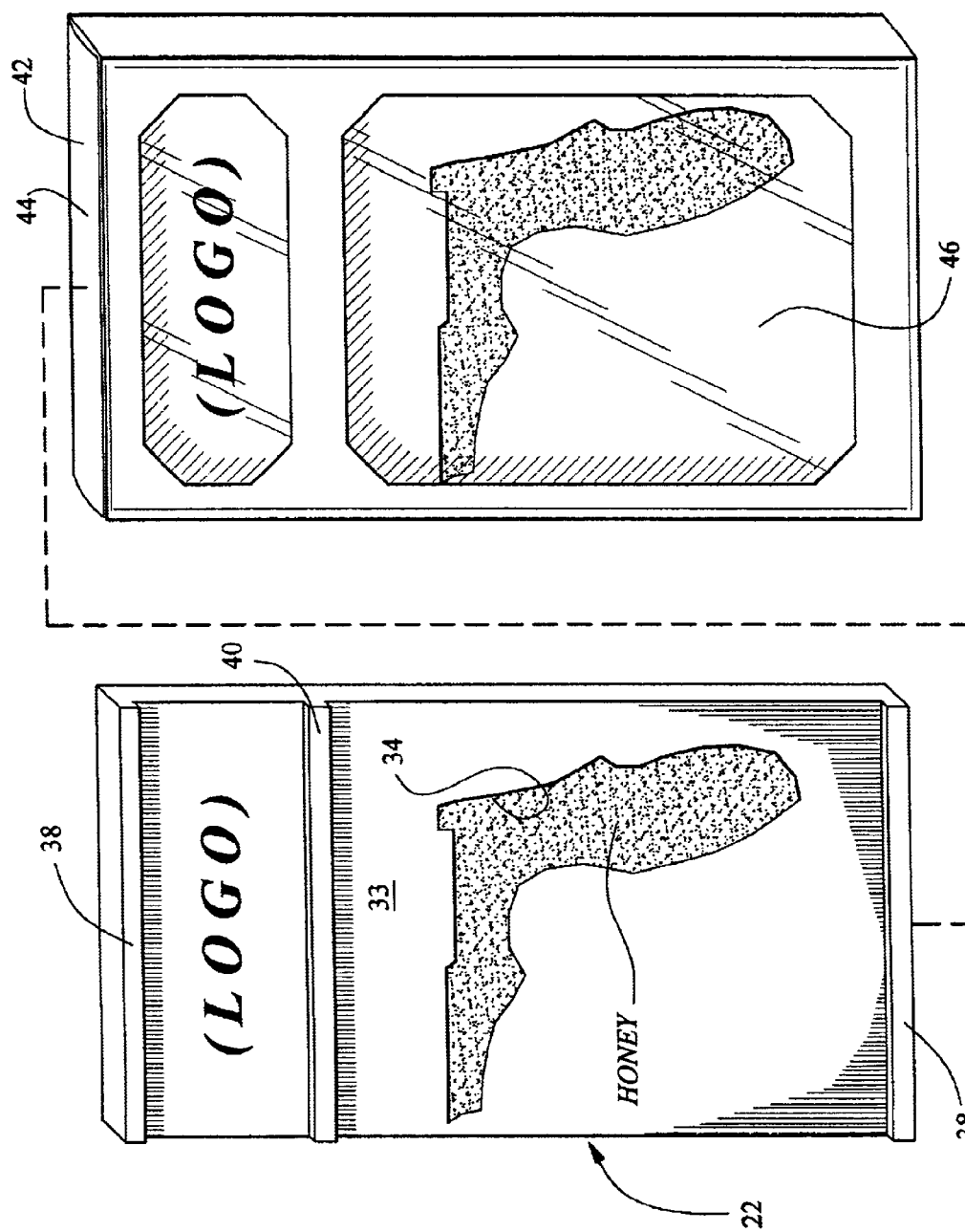
FIG. 5 is an exploded view in perspective illustrating the template with a cut-out designed in the State of Florida configuration and the box for insertion of the template with the honey filling the cut-out portion of the template of this invention.

The invention is best seen by referring to FIGS. 1–5 where the a suitable commercial beehive generally indicated by reference numeral 10 serves to house a queen bee for laying eggs and populating the beehive with worker bees. In accordance with this invention, a suitable box-like container 12 having opposite side walls 14 and opened on the top 16 and closed on the bottom 18 fits on to the top of beehive 10. A cover 20 serves to overlie the top 16 to enclose a plurality of parallely stacked inventive templates 22 which will be described in detail hereinbelow. The top wall 24 of beehive 10 includes a plurality of openings 26 which complement the openings 28 formed in the bottom wall 18 of the box-like container 12. In accordance with this invention, the space of these openings 26 and 28 and the space 30 between adjacent templates 22 is sufficient to allow the passage of the worker bee and yet not sufficient to permit the passage of the queen bee. (See FIG. 2). As is well known, the beehive includes an inlet/outlet opening 32 that provides the ingress and egress for the worker bees. The natural activity of the worker bees is to collect nectar and deposit it to produce honey and this invention takes advantage of this process by providing a cut-out portion in the template 22 where the honey is collected. The template is made from a planar wood rectangularly shaped member 33 with the cut-out portion 34 formed therein, which in this instance is configured as the State of Florida. Obviously any configuration can be utilized. A suitable commercially available wax foundation 36 is attached to the back face of the wood member and overlies the cut-out portion 34 to enclose the bottom of the cut-out portion 34. In other words, the cut-out portion is basically a recess or pocket formed intermediate the top, bottom and opposing sides of the template. Upstanding portions 38 may be formed on the ends of the wood member traversing the wood member and extending from the bottom to the top thereof, and being dimensioned for defining the size of the passageway 30 defined by the space between adjacent templates. If desired another similar dimensioned upstanding portion 40 spaced from top upstanding member 38 and parallel thereto is attached to the wood member 33 and defines a space where a logo or other indicia may be inserted on the template. The upstanding members 38 and 40 can simply be a piece of molding attached thereto or can be integrally formed in the wood member.

The normal process of the working bee is to regurgitate the nectar through its mouth into the cut-out portion 34 and vertically fill the cut-out portion 34. Hence, once the bee has collected nectar, it will return to the beehive, enter the inlet/outlet 32, continue through the beehive, enter the boxlike container 12 and pass through the space 30 until it reaches the cut-out portion 34 where it will leave the honey, and then return through the beehive 10, out of the inlet/outlet 32 for picking up more nectar and continuing with the process.

In the cut-out portion 34, the worker bee will start at the bottom of the cut-out portion, (relative to gravity) and build honey sectors formed in the honeycomb configuration with beeswax defining honeycomb cells until it reaches the top face of the wood portion 33. When the honey reaches the height of the cut-out portion 34, the bee will excrete the beeswax on the outside face of the honey. This process continues until the entire cut-out portion is filled, noting that a layer of beeswax overlies the top of the honey and preventing the honey from flowing out of the cut-out portion 34.

The next step in the process of packaging the honey is to remove the template 22 from the box-like container 12 and insert it into a package or box 42. Box 42 is a commercially available package with a closing top 44 and see-through windows 46 typically made out of cellophane material.

What has been shown by this invention is that the honey is unadulterated, i.e. it is never touched by human hands or human intervention as is done in heretofore known honey producing establishments, and the product is, in reality, pure honey. The consumer can then remove the template from its package, and release the honey which is supported by beeswax cells onto a plate or the like, much like a cake, and the honey and beeswax holds the honey in a semi-solid state where the consumer can slice off a portion of the honey at a time or as needed.

Although this invention has been shown and described with respect to detailed embodiments thereof, it will be appreciated and understood by those skilled in the art that various changes in form and detail thereof may be made without departing from the spirit and scope of the claimed invention.

I claim:

1. A template for packaging honey regurgitated from bees housed in a bee hive which template is marketed, said template including a planar member having at least one recess defining an ornamental configuration formed intermediate the edges of the planar member, a wax foundation sheet attached to one face of the planar member and overlying the recess to define a pocket for receiving honey, said template operatively connected to said beehive whereby worker bees are directed into said pocket from said beehive for regurgitating honey and filling the pocket with honey and sealing the top thereof with beeswax so that the template with the honey is removed from the beehive whereby the template with the honey is packaged and defines a salable merchandise.

2. A template as claimed in claim 1 including another template, said template and said other template being stacked parallel to each other, at least one of said two templates including a pair of spaced, parallel cross pieces mounted on the planar member to define a space between said template and said other template, wherein said space being sufficiently large to permit the passage of worker bees and insufficiently large to permit the passage of a queen bee.

3. A template as claimed in claim 2 including another cross piece mounted on the face of said planar member and spaced parallel to one of said cross pieces to permit space therebetween for including indicia on said planar member.

4. A template as claimed in claim 1 wherein the material of said planar member is wood.

5. A template as claimed in claim 4 wherein said planar member is rectangularly shaped.

* * * * *